July 9, 1929.   A. V. LIVINGSTON   1,720,521

STORAGE BATTERY CHARGING SYSTEM

Filed June 2, 1925

Alan Varley Livingston INVENTOR.

BY

Robert S. Blair
ATTORNEY.

Patented July 9, 1929.

1,720,521

UNITED STATES PATENT OFFICE.

ALAN VARLEY LIVINGSTON, OF NEW HAVEN, CONNECTICUT, ASSIGNOR TO THE SAFETY CAR HEATING & LIGHTING COMPANY, A CORPORATION OF NEW JERSEY.

STORAGE-BATTERY-CHARGING SYSTEM.

Application filed June 2, 1925. Serial No. 34,278.

This invention relates to the charging of storage batteries and with regard to certain of the more specific features of this invention to the charging of storage batteries such as are used for auxiliary purposes as in electrically propelled vehicles or trains.

One of the objects of this invention is to provide a simple and thoroughly practical system and apparatus for charging a storage battery from a source of voltage materially higher than the voltage of the storage battery itself, and to provide a system and apparatus of the above-mentioned nature which will be of efficient operation and of thoroughly reliable and dependable action when in use. Another object of this invention is to provide a thoroughly practical system of the above nature in which the storage battery may be effectively safeguarded against overcharge. More particularly, is it an aim of this invention to insure the adequate charge of a storage battery from a relatively high voltage source in a manner capable of maintaining the energy losses at a very low value and thus capable of achieving a high degree of efficiency. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
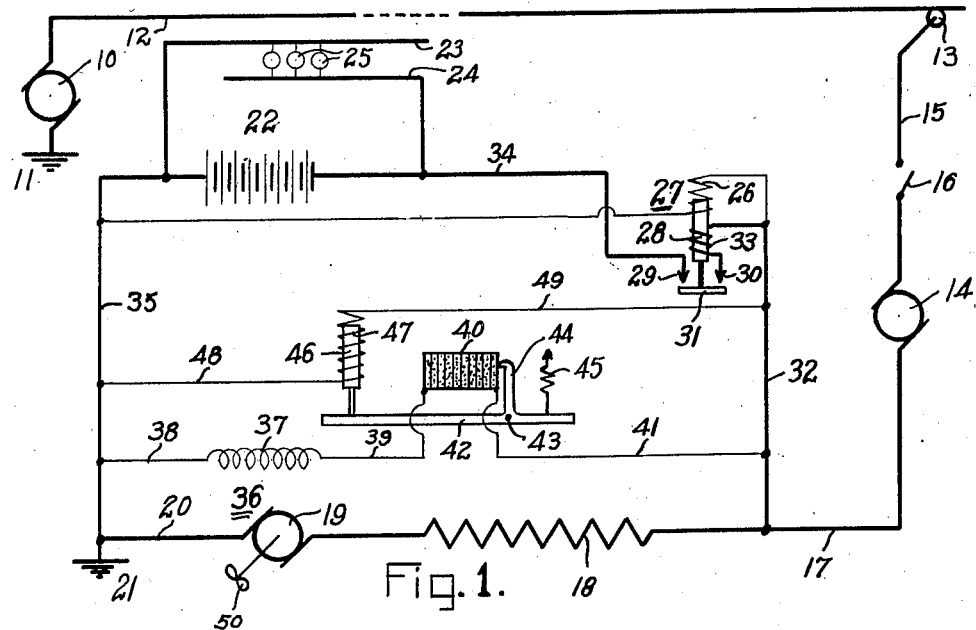
Figure 2:
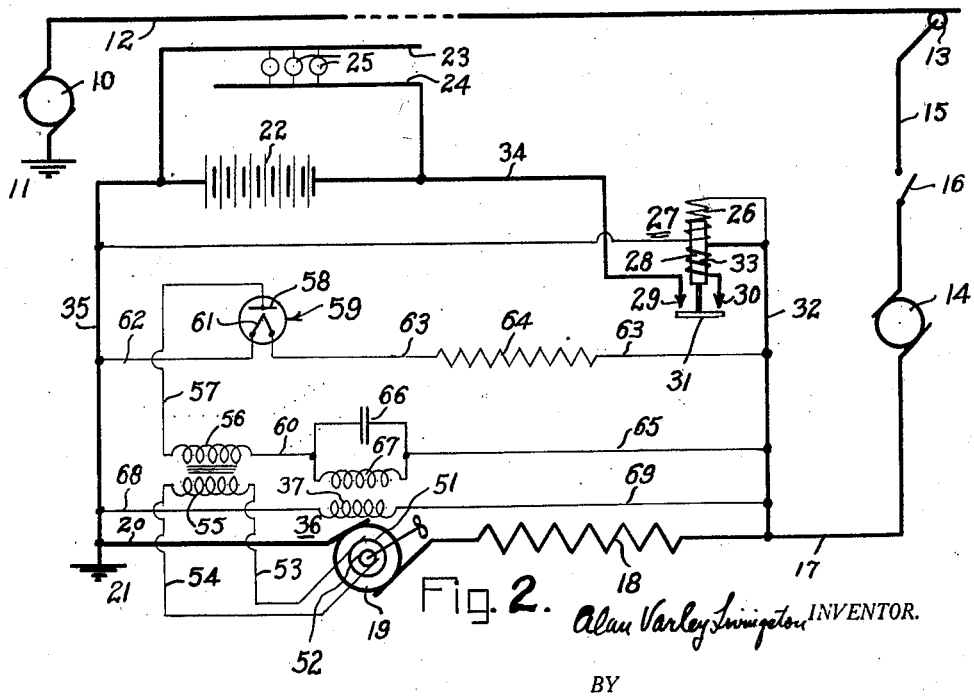

In the accompanying drawing, in which are shown several of various possible embodiments of the electrical features of this invention, Figure 1 represents diagrammatically the circuit arrangements of a system and apparatus for charging a storage battery from the transmission line used on a vehicle for auxiliary purposes, and Figure 2 illustrates in similar manner a modified but preferred form of system and apparatus.

Similar reference characters refer to similar parts throughout the several views in the drawing.

As conducive to a clearer understanding of certain features of this invention, it may at this point be noted that in electrically propelled vehicles, such as are used, for example, in rapid transit or subway service, the vehicles individually or the train as a whole are generally with a storage battery adapted to supply energy to certain auxiliary devices and circuits. This storage battery is of relatively low voltage and may, for example, be in the neighborhood of thirty-two volts where the battery is made up of sixteen cells; the transmission line voltage, on the other hand, may be in the neighborhood, for example, of six hundred volts. As an example of devices which the storage battery is intended to serve, it may at this point be noted that the apparatus and devices forming part of the remote control or multiple-unit control system, signal lamps, and lighting circuits, may constitute some of such devices which it is intended to supply with energy independently of the transmission line. It therefore is important to maintain the battery in a state of adequate charge in order that the battery may, upon a failure of the transmission line, supply energy to such devices as those noted above. One of the dominant aims of this invention is to provide a system and apparatus for insuring in a dependable manner the charging of such a storage battery from such a source of current as the transmission line, and to achieve such an object as the latter in a highly efficient way.

Turning now to the drawing, and more particularly to Figure 1, there is indicated at 10 a source of energy, of relatively high voltage, one terminal of which is grounded as at 11 and the other terminal of which is connected to the transmission line indicated at 12. The vehicle is equipped with an appropriate form of current-collecting device, such as a trolley or shoe, indicated at 13, so that the vehicle may be supplied with energy from the transmission line 12 while the vehicle is in transit or at rest.

The energy thus collected through the device 13 may be utilized for driving various translation devices, such as, for example, the motor or motors which drive the vehicle or the motor driving the compressor of the compressed air-brake system. Such a motor as the latter is indicated in the drawing at 14, and its circuit will be seen to extend from the collecting device 13 through conductor 15, any suitable form of switching device, either manual or automatic, and diagrammatically indicated at 16, thence through the motor 14, conductor 17, a suitable resistance 18, thence through the armature 19 of what will hereinafter be termed a counter E. M. F. motor, thence by way of conductor 20 to ground at 21. The storage battery for supplying energy to the auxiliary devices is indicated at 22, and it may be connected in any suitable manner to what will hereinafter be termed the "train line" comprising the conductors 23 and 24, and to which various auxiliary devices, such as the lamps 25, for example, may be connected; this train line 23—24 will be understood to be individual to the vehicle itself or to the entire train of vehicles.

Upon the closure of the switch 16, thus to make operative the motor 14, the resultant flow of current through the resistance 18 will cause a corresponding potential drop to be developed across the latter and across the armature 19 of the counter E. M. F. motor, and this potential drop, when of sufficient value energizes a winding 26 of an automatic switch generally indicated at 27 and causes the core 28 of the switch 27 to be lifted so that the switch contacts 29 and 30 are bridged by the switch member 31, which is suitably connected to the core 28. The closure of the switch 27 is in turn effective to connect the storage battery in a relation appropriate for it to receive a charging current. The resultant charging circuit of the battery 22 will be seen to be substantially as follows: from the conductor 17 (leading from the motor 14 and the current-collecting device 13) through conductor 32, coil 33 on the switch 27, contact 30, switch member 31, contact 29, conductor 34, through the battery 22 and by way of conductor 35 to ground at 21. The current flowing through the motor 14 will thus be provided with two parallel paths of flow to ground at 21; one of these paths will be seen, as above noted, to include the battery 22, and the other to include the resistance 18. Thus the battery 22 may receive a charging current from the relatively high transmission line, the motor 14 utilizing for practical purposes the major portion of this relatively high voltage.

The counter E. M. F. motor, generally indicated at 36, is provided with a field winding 37 arranged to provide a magnetic field within which the armature 19 may rotate; the latter, moreover, is preferably constructed to have a relatively low resistance and to have a current-carrying capacity adequate to carry the maximum current required by the motor 14 or its corresponding circuit. The field winding 37 has its one terminal connected through conductor 38 to the conductor 35; its other terminal is connected to conductor 32 by way of conductor 39, a carbon pile 40, and conductor 41. The closure of the switch 16, thus to make effective the source of current 10 in the motor circuit, thus also makes effective the energizing circuit of this field winding 37, but through the carbon pile 40 which may, because of the characteristics of the field winding 37, be of small capacity and will hence be characterized by low loss of energy.

Operative upon the carbon pile 40 is a lever 42 pivoted as at 43 and provided with an arm 44 operative upon the free or unanchored end of the carbon pile 40. A spring 45 acts upon the lever 42 in such a direction that, through the arm 44, the lever 42 tends to compress the carbon pile 40 and thus reduce its resistance. Acting in opposition to the spring 45 is a solenoid, the core 46 of which is connected to the lever 42 and the winding 47 of which is connected as by conductors 48 and 49 so as to be substantially bridged across the battery 22 and thus to be responsive substantially to the voltage thereof.

Assuming that the battery 22 is in a relatively low state of charge, the tractive effort of the coil 47 of the solenoid 46—47 will be so weak that the spring 45 is permitted to compress the carbon pile 40 and thus materially reduce its resistance; this reduced resistance of the carbon pile 40 insures the flow of a substantial exciting current through the field 37 of the motor 36, and the circuit of motor 14 having been already closed as hereinbefore assumed, the resultant flow of current through the resistance 18 and the armature 19 of the motor 36 causes a rotation of the armature 19 of the motor 36, but in this relatively strong magnetic field provided by the winding 37. The armature 19 of the motor 36, which is preferably connected to a constantly applied load conveniently taking the form of a fan 50, is thus made to develop a substantial voltage, but in such a direction that it opposes the flow of current in the immediate circuit of the resistance 18 and thus causes such a subdivision of the total current in the circuit of motor 14 that the major portion thereof or such a value as is commensurate with the intended charging rate of the battery 22 is caused to flow through the battery 22 and thus charge the latter. The charge of the battery may thus continue.

As the battery 22 approaches substantially full charge, it is characterized by a substantial rise in voltage, and this rise in voltage strengthens the winding 47 of the solenoid 46—47 and causes the latter to more strongly oppose the action of spring 45 and thus, by reducing the pressure on the carbon pile 40, to increase the resistance of the latter. This increase in resistance causes a corresponding decrease in the excitation current flowing to the field 37 of the counter E. M. F. motor 36, and this action in turn causes a reduction in the opposing voltage generated in the armature 19 of the motor 36. A corresponding readjustment of the division of the current between the two parallel circuits results, the immediate circuit of the resistance 18 is made to carry a greater current, and the circuit in parallel thereto and in which is included the battery 22 is made to carry a lesser current.

This action of readjustment of the division of current between these two parallel circuits may continue at a rate depending upon the rate of rise of voltage of the battery 22 as the latter approaches full charge, and the parts may be so adjusted or constructed that, at the predetermined voltage at which it is desired to have the charge of the battery 22 cease, the voltage of the counter E. M. F. motor 36 has been made such that the battery 22 is substantially floated across its corresponding parallel circuit and the latter made to carry substantially the entire current flowing through the motor 14. Thus, the battery 22 may be effectively and reliably safeguarded against overcharge, and it will be noted that the system and apparatus thus provided lends itself readily to embodiment in such practical form that heat or like energy losses are effectively minimized and high efficiency of operation achieved.

Should the circuit of the motor 14 be at any time opened, or the source 10 become ineffective for any reason, the automatic switch 27 at once opens the circuit of the battery 22, the reversal of the current flowing through the holding coil 33 of the switch 27 so counteracting the effect of the lifting coil 26 that the core 28 and hence the switch member 31 of the switch 27 are permitted to drop, thus opening the battery circuit at the contacts 29—30.

In Figure 2 in which I have illustrated a preferred embodiment of this invention, I have provided the counter E. M. F. motor 36 with slip rings 51—52, appropriately related to the windings of the armature 19, so that an alternating current may be generated upon the rotation of the armature 19. The brushes associated with the slip rings 51—52 lead this alternating current through conductors 53 and 54 to the primary winding 55 of a transformer in order that the secondary winding 56 thereof may constitute a convenient source of appropriate higher potential, even though alternating. A conductor 57 connects one terminal of the secondary winding 56 to the plate 58 of a thermionic device 59, whereas conductor 60 connects the other terminal of the secondary winding 56 to one terminal of the differential field winding 67 of the counter E. M. F. motor 36. The main field winding 37 of the counter E. M. F. motor 19 is connected through conductors 68 and 69 to conductors 35 and 32 respectively, and hence will be energized at a voltage commensurate with that across the battery 22 or across the motor 19 and resistance 18.

The thermionic device 59 is provided with a suitable source of electrons, conveniently taking the form of the filament 61, the latter being connected by conductors 62 and 63 so that, upon the closure of the automatic switch 27, the filament 61 will be responsive to the voltage of the storage battery 22. The filament 61 may be constructed to operate at any appropriate voltage and very conveniently there is interpositioned in the conductor 63 a suitable resistance 64. The resistance 64 may be made of such a value that the resultant filament circuit may operate throughout the range of voltage of the storage battery 22 without danger to the filament 61 itself. The circuit of the field winding 67 includes the electron path provided by the thermionic device 59 and this circuit may, for the sake of clarity, be traced as follows:—from one terminal of the field winding 67 of the counter E. M. F. motor 36, conductor 60, secondary winding 56 of the transformer 55—56, conductor 57, electrode or plate 58 of the device 59, filament 61, conductor 63, resistance 64, conductor 32, and thence by way of conductor 65 to the other terminal of the field winding 67. The electron path in the device 59 being unidirectionally conductive of electricity will thus insure the supply of unidirectional current to the differential field winding 67, this current being obtained by the resultant rectifying action of the device 59 upon the alternating E. M. F. produced in the secondary winding 56 of the transformer. The ratio of transformation of the transformer 55—56 may be made appropriate to insure the supply of a voltage high enough in the plate circuit of the device 59 to in turn insure adequate excitation current to the differential field winding 67 of the counter E. M. F. motor 36. A condenser 66 is conveniently bridged across the differential field winding 67 and acts to smooth out the rectified exciting current.

Considering now the action of this preferred embodiment of my invention, and assuming that the storage battery 22 is in a relatively low state of charge, the voltage across the battery will be relatively low and the degree of incandescence of the filament 61 of the valve 59 will be correspondingly low. The resultant emanations of electrons will be low, the electron path in the valve 59 and hence in the circuit of the differential field winding 67 will be of higher resistance. The voltage across the main field winding 37 of the counter E. M. F. motor 36 will likewise be relatively low, and the two field windings of the counter E. M. F. motor 36 are so proportioned, that, under these conditions, the winding 37 is sufficiently preponderant to cause the motor 36 to develop such a voltage that the division of the current flowing through the motor 14 and between the battery circuit and the circuit of the resistance 18 is, under these conditions, preferably caused to be such that substantially the normal charging current flows in the branch in which the battery 22 is included. The battery 22 may thus be supplied with charging current at substantially its normal rate.

Assuming that the switch 16 remains closed and the charging of the battery 22 thus continued, the back E. M. F. of the battery 22 will be characterized by a substantial increase or rise as the battery approaches substantially full charge. This rise in back E. M. F. of the battery causes in turn a rise in the charging voltage applied thereto and, the filament 61 of the thermionic device 59, being connected to be responsive to the voltage across the battery, has its incandenscence increased and correspondingly its thermionic emission enhanced. As this action takes place, however, the main field winding 37 of the counter E. M. F. motor 36 has become strengthened to a degree commensurate with the increase in voltage across the battery 22 and thus also the voltage applied to the plate 58 of the thermionic device 59 has been increased. The latter phenomena, together with the increase in incandescence in the filament 61, has brought about, however, a much greater increase in the current flowing through the differential field 67 of the motor 36, due to the characteristics of the vacuum tube than is the case of the increase in strength of the main field winding 37. The voltage generated by the armature 19 of the motor 36 is thus decreased, and thus less resistance to passage of current is provided in the branch in which is included the motor 36 and the resistance 18. A corresponding readjustment of the division of current between this latter branch and the battery branch takes place, the current in the latter being thus progressively decreased, and if the circuit remains operative, the continuing rise in back voltage of the battery 22 may thus bring about an eventual condition where the flow of charging current to the battery is substantially diminished to such a value that the battery in effect is "floated" across the potential represented by the potential drop in the resistance 18 and the voltage generated in the armature 19 of the motor 36, it being noted that the latter insures the maintenance of this total potential so that the battery is effectively protected against overcharge.

The fan 50 driven by the rotating element of the motor 36 applies to the motor 36 a substantially constant load and thus insuring substantial constancy of speed of rotation of the rotating element of the motor.

Should the switch 16 be opened at any time in the course of the above-described operation of the apparatus, the automatic switch 27 opens to prevent discharge of the battery 22 into the circuit connected otherwise in parallel therewith, but leaves the battery 22 free to supply energy to the train line 23—24. The opening of the switch 16 and consequent opening of the switch 27 also deenergizes the field windings of the counter E. M. F. motor 36 and also the filament 61 of the varuum tube 59, and thus waste of energy in these circuits is avoided. A subsequent closure of switch 16 is followed by the automatic closure of the switch 27 and the prompt reconditioning of the apparatus by the latter for adjusting the rate of charge to the battery 22 in accordance with the instantaneous state of charge of the latter.

It will thus be seen that there has been provided in this invention an apparatus in which the several objects hereinbefore noted, together with many thoroughly practical advantages are successfully achieved. It will be seen that the apparatus is of thoroughly reliable action throughout and moreover, of great efficiency; the counter E. M. F. motor may be readily made in practice to carry relatively heavy currents, but, being of low resistance, causes no substantial losses of energy and thus heat losses, which, where heavy currents are necessarily carried, may be of substantial magnitude. It will moreover, be seen that the battery is effectively safeguarded against overcharge and that the apparatus is of a thoroughly practical nature and well adapted to meet the varying conditions of hard practical use.

As many possible embodiments may be made of the above invention, and as many changes might be made in the embodiment above set forth, it is to be understood that all matter hereinbefore set forth or shown in the accompanying drawing, is to be interpreted as illustrative and not in a limiting sense.

I claim as my invention:

1. In apparatus of the character described, in combination, a power circuit having included therein a translating device adapted to be operated therefrom, a storage battery connected in series with said device, thereby to be charged from said circuit, a shunt circuit around said battery, and means arranged to produce a counter E. M. F. for controlling the division of current between said shunt circuit and said battery.

2. In apparatus of the character described, in combination, a power circuit having included therein a translating device adapted to be operated therefrom, a storage battery connected in series with said device, thereby to be charged from said circuit, a shunt circuit around said battery, means for producing a counter E. M. F. and arranged to affect the division of current between said shunt circuit and said battery, and means responsive to the state of charge of said battery for controlling the action of said last-mentioned means.

3. In apparatus of the character described, in combination, a power circuit having included therein a translating device adapted to be operated therefrom, a storage battery connected in series with said device thereby to be charged from said circuit, a resistance shunted around said battery, and a counter E. M. F. device in circuit with said resistance for controlling the division of current between said battery and said resistance.

4. In apparatus of the character described, in combination, a storage battery, a source of current for charging said battery and adapted to be connected thereto, a by-pass circuit around said battery, and means including a device having spaced electrodes between which ionic conduction takes place for controlling the division of current between said battery and said by-pass circuit.

5. In apparatus of the character described, in combination, a storage battery, a source of current for charging said battery and adapted to be connected thereto, a by-pass circuit around said battery, a counter E. M. F. device arranged to affect the division of current between said battery and said by-pass circuit, and means responsive to the state of charge of said battery for controlling the action of said counter E. M. F. device.

6. In apparatus of the character described, in combination, a storage battery, a source of current for charging said battery and adapted to be connected thereto, a by-pass circuit around said battery, a counter E. M. F. device arranged to affect the division of current between said battery and said by-pass circuit, and means including a device having spaced electrodes between which ionic conduction takes place for controlling the action of said counter E. M. F. device.

7. In apparatus of the character described, in combination, a storage battery, a source of current for charging said battery and adapted to be connected thereto, a by-pass circuit around said battery, a counter E. M. F. device arranged to affect the division of current between said battery and said by-pass circuit, and a thermionic device having its filament arranged to be responsive substantially to the voltage of said battery for controlling the action of said counter E. M. F. device.

8. In apparatus of the character described, in combination, a storage battery, a source of current for charging said battery and adapted to be connected thereto, a by-pass circuit around said battery, a counter E. M. F. motor arranged to affect the division of current between said battery and said by-pass circuit, a device having spaced electrodes between which ionic conduction takes place for controlling the action of said counter E. M. F. motor, and means for supplying a relatively high potential to an electrode of said device comprising a generating winding associated with said counter E. M. F. motor.

9. In apparatus of the character described, in combination, a storage battery, a source of current for charging said battery and adapted to be connected thereto, a by-pass circuit around said battery, a counter E. M. F. motor arranged to affect the division of current between said by-pass circuit and said battery and provided with a pair of output terminals, and a device having spaced electrodes between which ionic conduction takes place for controlling the action of said counter E. M. F. motor, one of the electrodes of said device being supplied with energy from the output terminals of said counter E. M. F. motor.

10. In apparatus of the character described, in combination, a storage battery, a source of current for charging said battery and adapted to be connected thereto, a by-pass circuit around said battery, a counter E. M. F. motor arranged to affect the division of current between said by-pass circuit and said battery and provided with a pair of output terminals, and a thermionic device for controlling the action of said counter E. M. F. motor, said thermionic device having its filament connected to be responsive substantially to battery voltage and an electrode of said thermionic device being supplied with energy from the output terminals of said counter E. M. F. motor.

11. In apparatus of the character described, in combination, a storage battery, a source of current for charging said battery and adapted to be connected thereto, a by-pass circuit around said battery, a counter E. M. F. motor arranged to affect the division of current between said battery and said by-pass circuit and arranged to supply an alternating E. M. F., and a device having spaced electrodes between which ionic conduction takes place arranged to control the action of said counter E. M. F. motor, one of the electrodes of said device being energized by the alternating E. M. F. supplied by said counter E. M. F. motor.

12. In apparatus of the character described, in combination, a storage battery, a source of current for charging said battery and adapted to be connected thereto, a by-pass circuit around said battery, a counter E. M. F. motor arranged to affect the division of current between said battery and said by-pass circuit and arranged to supply an alternating E. M. F., a device having spaced electrodes between which ionic conduction takes place for controlling the action of said counter E. M. F. motor, and having a transformer interposed between the alternating E. M. F. output of said motor and an electrode of said device.

13. In apparatus of the character described, in combination, a storage battery, a source of current for charging said battery and adapted to be connected thereto, a by-pass circuit around said battery, a counter E. M. F. motor arranged to control the division of current between said by-pass circuit and said battery, and means responsive to the state of charge of said battery for controlling the field of said counter E. M. F. motor.

14. In apparatus of the character described, in combination, a storage battery, a source of current for charging said battery and adapted to be connected thereto, a by-pass circuit around said battery, a counter E. M. F. motor arranged to control the division of current between said by-pass circuit and said battery, and a thermionic device having its filament arranged to be responsive to the battery voltage and adapted to control the excitation of said counter E. M. F. motor.

15. In apparatus of the character described, in combination, a storage battery, a source of current of a voltage higher than that of the battery, means adapted to be operated from said source and connected thereto through a resistance, said battery being connected in shunt to said resistance, and means arranged to produce a counter E. M. F. for controlling the division of current between said battery and said resistance.

16. In apparatus of the character described, in combination, a storage battery, a source of current of a voltage higher than that of the battery, means adapted to be operated from said source and connected thereto through a resistance, said battery being connected in shunt to said resistance, means adapted to provide a counter E. M. F. and arranged to affect the division of current between said battery and said shunt resistance, and means responsive to the state of charge of said battery for controlling the action of said counter E. M. F. means.

17. In apparatus of the character described, in combination, a storage battery, a source of current of a voltage higher than that of the battery, means adapted to be operated from said source and connected thereto through a resistance, said battery being connected in shunt to said resistance, means adapted to provide a counter E. M. F. and arranged to affect the division of current between said battery and said shunt resistance, and a device having spaced electrodes between which ionic conduction takes place arranged to be responsive to the state of charge of said battery and adapted to control the action of said counter E. M. F. means.

18. In apparatus of the character described, in combination, a storage battery, a power circuit, a translating device adapted to be intermittently operated from said power circuit, connecting mechanism between said battery and said circuit arranged to be responsive to operative condition of said translating device for connecting said battery to said circuit and responsive to ineffective condition of said device for disconnecting said battery from said circuit, and means including a device having spaced electrodes between which ionic conduction takes place for protecting said battery against overcharge.

19. In apparatus of the character described, in combination, a storage battery, a power circuit, a translating device adapted to be intermittently operated from said power circuit, connecting mechanism between said battery and said circuit arranged to be responsive to operative condition of said translating device for connecting said battery to said circuit and responsive to ineffective condition of said device for disconnecting said battery from said circuit, and means including a thermionic device for protecting said battery against overcharge, said thermionic device having its filament connected to be responsive to the condition of operation of said translating device.

20. In apparatus of the character described, in combination, a storage battery, a power circuit, a translating device adapted to be intermittently operated from said power circuit, connecting mechanism between said battery and said circuit arranged to be responsive to operative condition of said translating device for connecting said battery to said circuit and responsive to ineffective condition of said device for disconnecting said battery from said circuit, means including a counter E. M. F. motor for protecting said battery against overcharge, and means responsive to the state of charge of said battery for controlling the action of said counter E. M. F. motor.

21. In apparatus of the character described, in combination, a storage battery, a power circuit, a translating device adapted to be intermittently operated from said power circuit, connecting mechanism between said battery and said circuit arranged to be responsive to operative condition of said translating device for connecting said battery to said circuit and responsive to ineffective condition of said device for disconnecting said battery from said circuit, means including a counter E. M. F. motor for protecting said battery against overcharge, and a thermionic device arranged to be responsive to the state of charge of said battery for controlling the action of said counter E. M. F. motor.

22. In apparatus of the character described in combination, a storage battery, a source of current for charging said battery, a thermionic device providing an electron path of flow for current and connected so that the electron emission therein varies substantially in accordance with the change in the state of charge of said battery, and means affected by the change in electron emission of said device for controlling the flow of current to said battery.

23. In apparatus of the character described, in combination, a storage battery, a source of current for charging said battery, a counter E. M. F. motor for controlling the flow of current to said battery, a field winding for said motor adapted to be energized at a voltage substantially equivalent to that impressed across the battery, an opposing field winding for said motor, and a device having spaced electrodes between which ionic conduction takes place for controlling the flow of current through said opposing field winding.

24. In apparatus of the character described, in combination, a storage battery, a source of current of a voltage materially higher than that of the battery, a translating device adapted to be operated from said source and connected thereto through a resistance and a counter E. M. F. device, said battery being connected in shunt to said counter E. M. F. device and said resistance, and means responsive to the state of charge of said battery for controlling said counter E. M. F. device.

25. In apparatus of the character described, in combination, a storage battery, a source of current of a voltage materially higher than that of the battery, a translating device adapted to be operated from said source and connected thereto through a resistance and a counter E. M. F. device, said battery being connected in shunt to said counter E. M. F. device and said resistance, means responsive to the state of charge of said battery for controlling said counter E. M. F. device, and means effective upon the cutting off of said source of current for preventing said battery from discharging through said counter E. M. F. device and said resistance.

26. In apparatus of the character described, in combination, a storage battery, a source of current for charging said battery, means for varying the rate of charging current to said battery, and a thermionic device arranged, upon said battery approaching substantially full charge, to affect said means, thereby to cut down the charging current to said battery.

In testimony whereof, I have signed my name to this specification this twenty seventh day of May, nineteen hundred and twenty five.

ALAN VARLEY LIVINGSTON.